United States Patent [19]

Marsh et al.

[11] Patent Number: 5,445,905
[45] Date of Patent: Aug. 29, 1995

[54] DUAL FLOW ALUMINUM HYDROGEN PEROXIDE BATTERY

[75] Inventors: Catherine L. Marsh, Exeter, R.I.; Stuart L. Licht, Charlton City, Mass.; Donna E. Matthews, Portsmouth, R.I.

[73] Assignee: The United States of America as represented by the Secretary of the Navy, Washington, D.C.

[21] Appl. No.: 168,789

[22] Filed: Nov. 30, 1993

[51] Int. Cl.⁶ .................................. H01M 4/36
[52] U.S. Cl. ............................. 429/105; 429/27; 429/101
[58] Field of Search ............. 429/105, 27, 206, 218, 429/188, 101, 29

[56] References Cited

U.S. PATENT DOCUMENTS

| | | | |
|---|---|---|---|
| 4,328,291 | 5/1982 | Winsel | 429/27 X |
| 4,348,465 | 9/1982 | Struthers | 429/27 |
| 4,492,741 | 1/1985 | Struthers | 429/101 X |
| 4,528,249 | 7/1985 | Garbraith | 429/15 |
| 4,910,102 | 3/1990 | Rao et al. | 429/51 |

Primary Examiner—John S. Maples
Attorney, Agent, or Firm—Michael J. McGowan; Prithvi C. Lall; Michael F. Oglo

[57] ABSTRACT

A novel dual flow battery configuration is provided comprising an aqueous hydrogen peroxide catholyte, an aqueous anolyte, a porous solid electrocatalyst capable of reducing said hydrogen peroxide and separating said anolyte, and an aluminum anode positioned within said anolyte. Separation of catholyte and anolyte chambers prevents hydrogen peroxide poisoning of the aluminum anode.

17 Claims, 5 Drawing Sheets

DUAL FLOW ALUMINUM HYDROGEN PEROXIDE BATTERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates to an improved aluminum-hydrogen peroxide battery which prevents the detrimental effects of peroxide on aluminum and eliminates the need for a resistive separator to separate anode or cathode compartments. More particularly, this invention relates to such a battery which utilizes a porous electrocatalyst composition to separate reactive catholyte solution from the anode compartment.

(2) Description of the Prior Art

Presently, a high power density primary battery based on aluminum and silver oxide alkaline half cells provide sufficient energy for vehicle propulsion. The major advantages of this electrochemical system is the extraordinarily high current densities, i.e., of the order of 1600 milliamps/cm$^2$, which are readily achieved. The high current densities of the alkaline aluminum-silver oxide oxidation-reduction couple may be attributed to the anomalous solid phase mobility of the silver ion in the silver oxide cathode. Unlike other cations, the silver cation travels rapidly not only through the liquid phase but also through the solid phase of its salts. Therefore, as AgO is reduced Ag$^+$ can continually travel to the electrode interface, preventing surface passivation and permitting continuous facile electron transfer. The major disadvantages of the alkaline aluminum-silver oxide primary battery are the significant costs of the silver oxide cathode and the relatively low faradic storage capacity of the silver oxide compared to aluminum.

In batteries which utilize a dissolved cathodic species, such as hydrogen peroxide, the dissolved cathodic species come into contact with an electrocatalytic electrode and are reduced during discharge. These solution phase batteries present problems which are not typically associated with solid cathode materials such as silver oxide. Specifically, unless isolated with a separator, the peroxide is in contact not only with the electrocatalytic electrode, but also with the solid anode. Peroxide contacting the aluminum anode can be detrimental towards battery performance in two ways. Firstly, the peroxide will "cathodically shift", diminish, the anode potential, and therefore reduce the battery voltage. Secondly, peroxide is chemically reactive with aluminum. Thus, the peroxide can create non-electrochemical energy-producing/"parasitic" chemical pathways for the consumption of reactive anode and cathode materials. When the rate of these chemical reactions is much slower than that of the electrochemical process, this parasitic reaction does not pose a problem. However, when the rate is comparable, a resistive separator is required to prevent the cathodic species from interacting with the anode to minimize the parasitic reactions. To provide a viable battery system, the electrochemical reactions must be maximized and the effects of the parasitic reactions minimized.

In the present state of the art, solution phase systems utilize a common chamber for the anolyte and the catholyte or two chambers that are separated by a resistive barrier. In the former case, the direct contact of the catholyte with the anode material causes voltage or material losses which adversely affect the battery performance. This results in either reduced efficiency or significant polarization losses. In the latter case, the resistive barrier creates an IR loss which reduces the net voltage expected from the system. As an example, U.S. Pat. No. 4,910,102 discloses a battery having an aluminum anode and a cathode wherein bipolar electrodes are interposed between the anode and the cathode. Means are provided for passing a hydrogen peroxide aqueous solution through the battery assembly. It is thus desirable to provide an aluminum based battery which permits substitution of the silver cathode in order to eliminate the disadvantages associated with the cathode.

SUMMARY OF THE INVENTION

This invention provides a dual flow battery which comprises an aluminum anode, hydrogen peroxide catholyte, and an aqueous alkali, seawater or a mixture of aqueous alkali and seawater as an anolyte.

$$2Al + 3H_2O + 2OH^- \rightarrow 2AlO_2^- + 4H_2O, E_{cell} = 2.11 \text{ V} \quad (1)$$

This dual flow battery is characterized by the utilization of a highly porous electrocatalyst to separate the reactive catholyte solution from the anodic compartment. This new dual flow battery configuration allows solution phase battery systems to achieve increased current densities and increased voltages. Such a configuration for the aluminum-hydrogen peroxide battery results in an open circuit voltage (1.9 volts) greater than that demonstrated with previous cell configurations, and prevents peroxide parasitic reaction with aluminum.

In the present invention, a dual flow system is provided which allows for separated flow through anolyte and catholyte chambers utilizing a material which renders the reactive cathodic species non-reactive towards the anode. In this system, a highly porous electrocatalytic cathode acts to separate the active cathode species from the anode electrolyte chamber. Prior to entering the anodic compartment, the reactive catholyte species must pass through the porous electrocatalyst where the species are electrochemically reduced. After entering the anodic compartment, the resultant reduced species are beneficially utilized in the anodic discharge of the anode material or may be inert to that reaction. The result is a battery which combines the high voltage and anodic efficiency of a catholyte free aluminum anode, yet acts in concert with a high current density hydrogen peroxide cathode.

It is an object of subject invention to provide a battery having a flowing electrolyte system in which a reactive catholyte species is electrochemically reduced prior to contacting the anolyte chamber but without an ionic separator.

Another object of subject invention is to reduce IR loss so that there is no loss in the net voltage of the system.

Still another object of subject invention is to provide a viable battery system wherein electrochemical reactions are maximized and the effects of parasitic reactions are minimized.

Other objects, advantages and novel features of the invention will become apparent from the following detailed description of the invention when considered in conjunction with the accompanying drawings wherein:

DESCRIPTION OF THE PREFERRED EMBODIMENTS

The present invention provides a battery which is based upon the following electrochemical reactions:

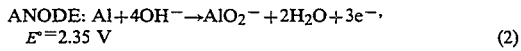

ANODE: $Al + 4OH^- \rightarrow AlO_2^- + 2H_2O + 3e^-$,
$E^\circ = 2.35$ V    (2)

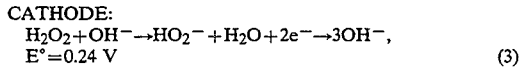

CATHODE:
$H_2O_2 + OH^- \rightarrow HO_2^- + H_2O + 2e^- \rightarrow 3OH^-$,
$E^\circ = 0.24$ V    (3)

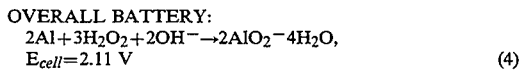

OVERALL BATTERY:
$2Al + 3H_2O_2 + 2OH^- \rightarrow 2AlO_2^- + 4H_2O$,
$E_{cell} = 2.11$ V    (4)

It should be noted that equation (4) is the same as equation (1). On a theoretical basis, the Al—$H_2O_2$ electrochemical couple compares favorably with the aluminum silver oxide battery as it has a significantly greater energy density 1437 watt hours per killogram (watt-hrs/Kgm) compared to 904 watt-hrs/Kgm for the aluminum silver oxide system.

The anode of the battery of this invention can be pure aluminum or that which is readily available at a purity of at least about 99.99% or an aluminum alloy or any of the materials such as lithium, magnesium, calcium or alloys thereof. The aluminum alloy has a composition which permits the electrochemical reaction at the anode to proceed as set forth above by Equation 2. Representative suitable alloys include aluminum-tin, aluminum-magnesium, aluminum-tin-gallium, aluminum-magnesium-gallium, aluminum-magnesium indium or the like.

In the battery of this invention, the catholyte solution is separated from the anolyte solution by a microporous solid electrocatalyst. The catholyte solution comprises an aqueous solution of 0.001 molar, to saturated hydrogen peroxide solutions preferably 0.5 to 1.5 molar hydrogen peroxide. The anolyte solution is an aqueous solution of an alkaline compound, seawater or mixtures of an alkaline compound and seawater electrolyte. Suitable alkaline compounds include sodium, or potassium hydroxide, alkaline salts such as ammonium chloride, bromide or iodide; potassium chloride, bromide or iodide or sodium chloride, bromide or iodide; mixtures thereof or the like. Generally, the alkaline compound and/or seawater is present in an amount in order to impart a conductivity to the solution of at least about 1 millimho/cm preferably at least about 100 millimho/cm.

Suitable porous electrocatalytic cathodes for separating the anolyte solution from the catholytic solution include nickel, copper, silver, or zinc, preferably nickel coated with a material electrocatalytic to $H_2O_2$ reductions such as platinum, iridium, palladium, or a combination such as Ir and Pd. The electrocatalytic cathode is sufficiently porous to permit electrolyte flow while not being so porous as to allow admixture of the catholyte with the anolyte prior to sufficient reduction of the catholyte. Suitable porosity is between about 20 and 300, preferably between about 80 and 150 pores per inch. The function of the electrocatalyst is to prevent the solution admixture as well as to effect reduction of the hydrogen peroxide catholyte.

Figure 1:
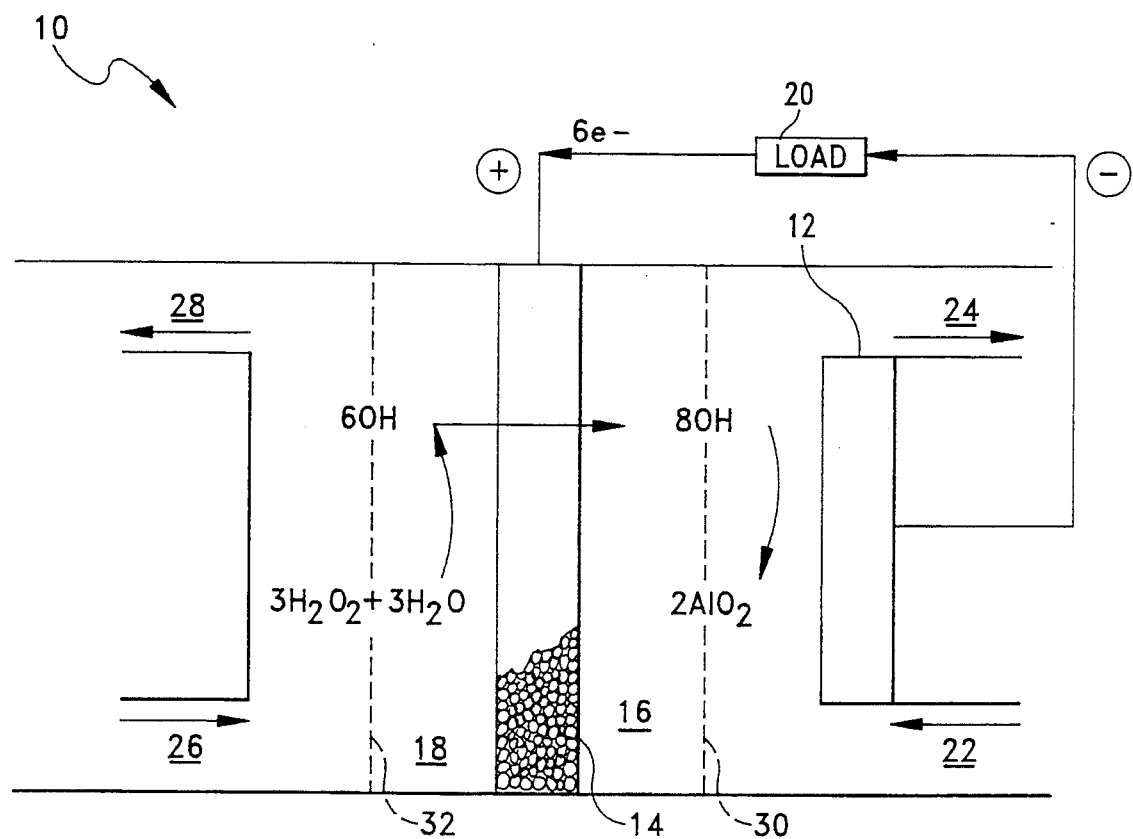
FIG. 1 is a schematic diagram of a battery of this invention.

Referring to FIG. 1, the battery 10 includes an aluminum anode 12, an electrocatalytic cathode 14 (the bottom part of 14 is shown in a breakout as a microporoous structure), an anolyte 16, and a hydrogen peroxide catholyte 18. A load 20 is provided between the anode 12 and the cathode 14. Anolyte is introduced through inlet 22 and removed through outlet 24. Catholyte is introduced through inlet 26 and removed through outlet 28.

The following examples illustrate the present invention and are not intended to limit the same.

EXAMPLE I

As shown in FIG. 1, a highly porous electrocatalytic cathode 14 acts to separate the hydrogen peroxide solution 18 from the anodic compartment including elements 12, 16, 22 and 24. All hydrogen peroxide 18 must pass through the porous cathode 14 where it is reduced to hydroxide prior to entering the anodic compartment. Once entering the anodic compartment, the hydroxide may be beneficially utilized in the anodic discharge of aluminum to eliminate $Al(OH)_4$. The result is a battery which combines the high voltage and anodic efficiency of a hydrogen peroxide free anode, yet acts in concert with a high current density hydrogen peroxide cathode. The anolyte chamber is constructed of an active anode material such as aluminum 12 and a spacer material 30. On the left side of this anode chamber rests a porous electrocatalytic material 14. The catholyte chamber composed of elements 26, 18, 28 and 14 is constructed from a second spacer 32 placed against the second (left hand) side of the porous electrocatalyst. This "sandwich" structure is held in a fixture which allows for flow through two separate inlet ports 22, 26. One inlet port will feed the catholyte chamber the other will feed the anolyte chamber. An aqueous electrolyte that does not contain a catholyte species 16 is supplied to the anode chamber through a pump. A separate pump supplies a catholyte containing hydrogen peroxide electrolyte 18 to the second chamber. Alternatively, one pump with separate feeds may be used rather than two pumps.

Figure 2:
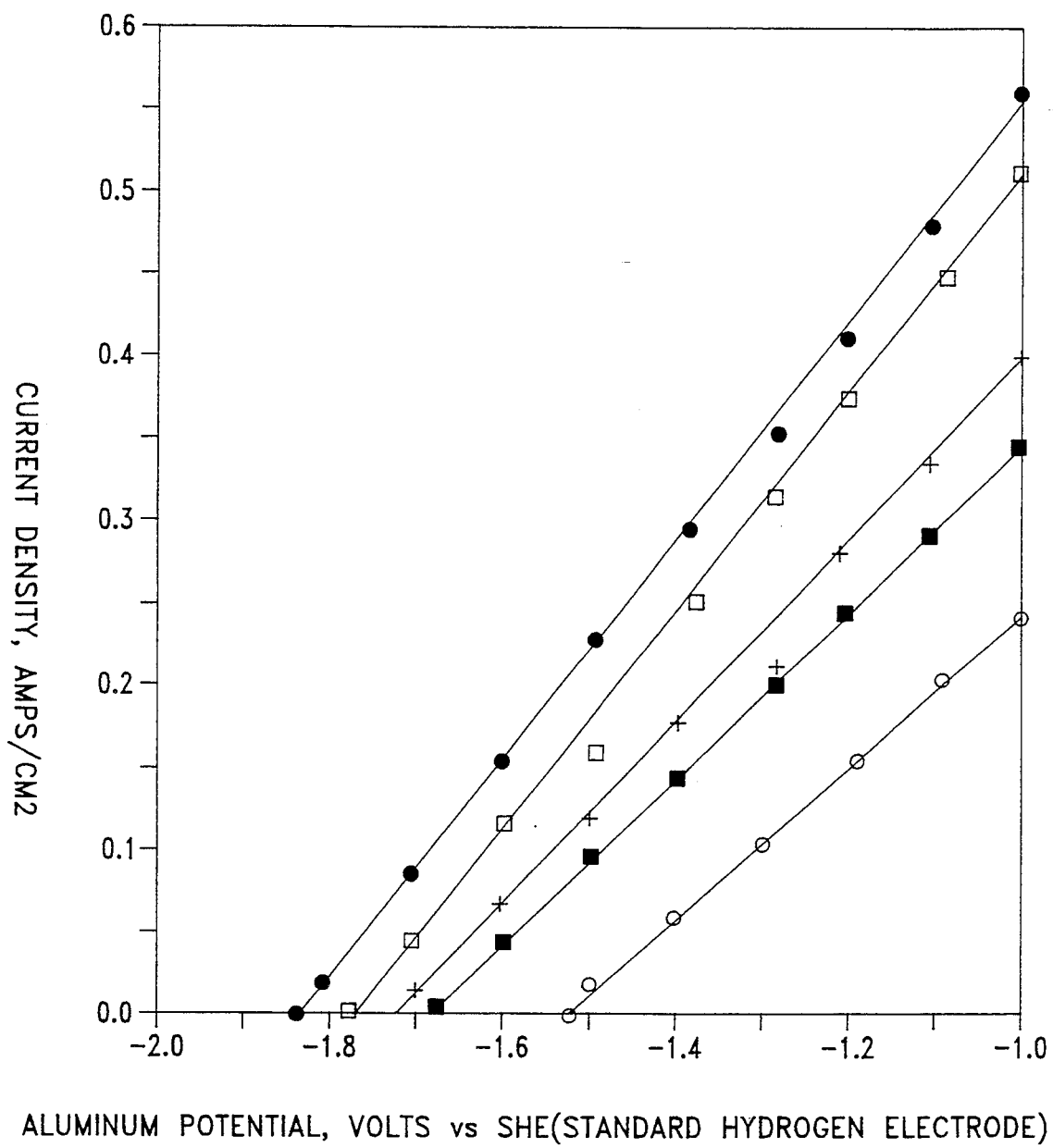
FIG. 2 is a graphical representation of the effect of peroxide on the aluminum anode of the battery of this invention, and specifically shows the measured anode potential as a function of applied current density.

FIG. 2 graphically represents voltage losses (cathodic shift) associated with an aluminum anode in contact with increasing concentrations of hydrogen peroxide as in an unseparated aluminum hydrogen peroxide battery.

Figure 3:
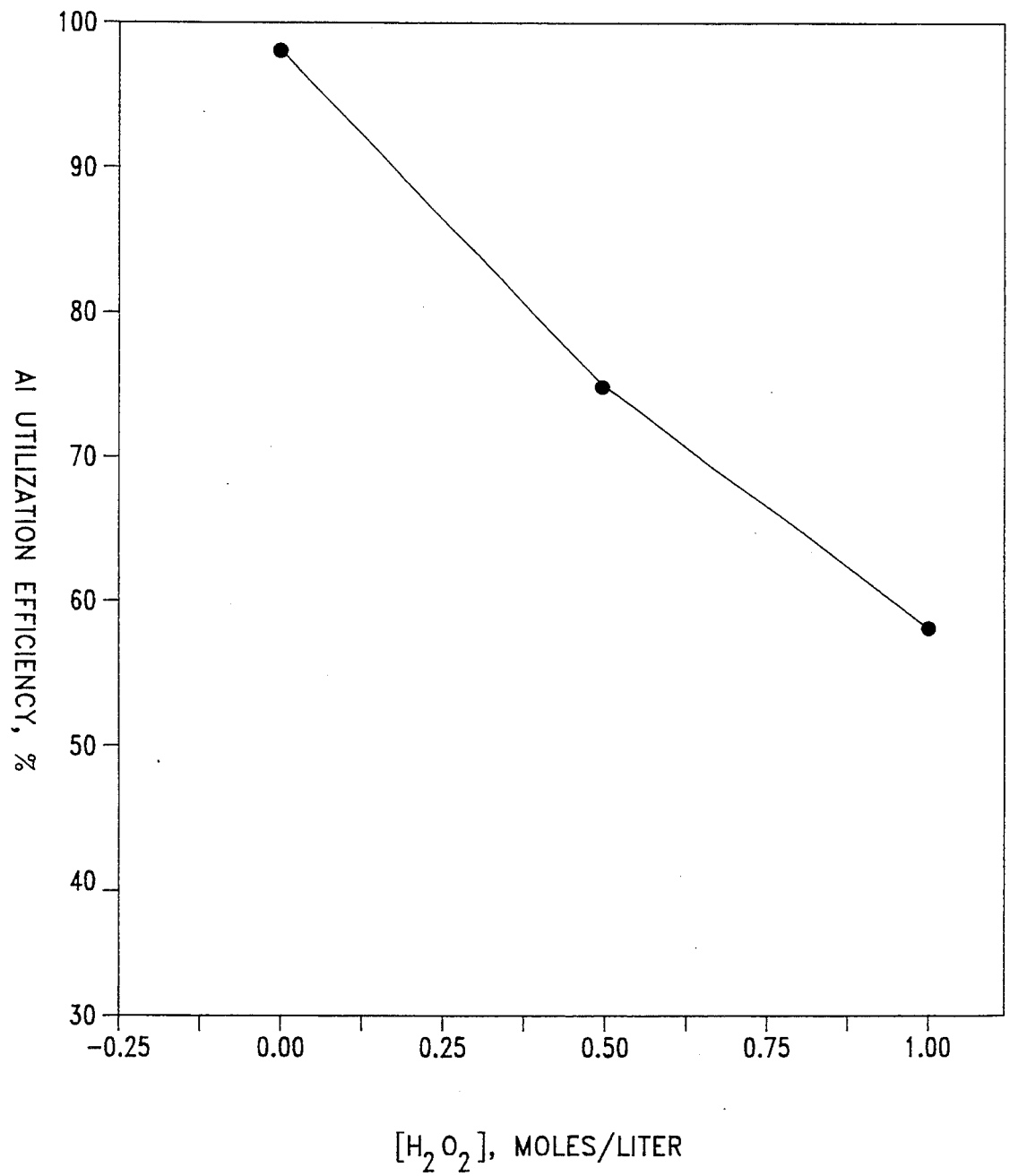
FIG. 3 shows graphically the effect of hydrogen peroxide on the utilization efficiency of the anode of the battery of subject invention.

FIG. 3 shows the known loss in anodic efficiency for aluminum in contact with an increasing concentration of hydrogen peroxide. One means to prevent these losses is to use a cationic selective membrane such as Permion HD 2291 sold by Raipore of New York to prevent movement of anionic hydrogen peroxide (dissolved as $HO_2^-$ in alkaline medium) towards the aluminum. However, the resistance of conventional cationic selective membranes creates unacceptable voltage losses at the operational high current densities requisite for cell operation. This invention provides a novel aluminum hydrogen peroxide battery configuration which acts to prevent contact between aluminum and dissolved hydrogen peroxide, and therefore operates without the problems associated with hydrogen peroxide poisoning of the aluminum anode. This is accomplished without the need of a resistive separator.

Figure 4:
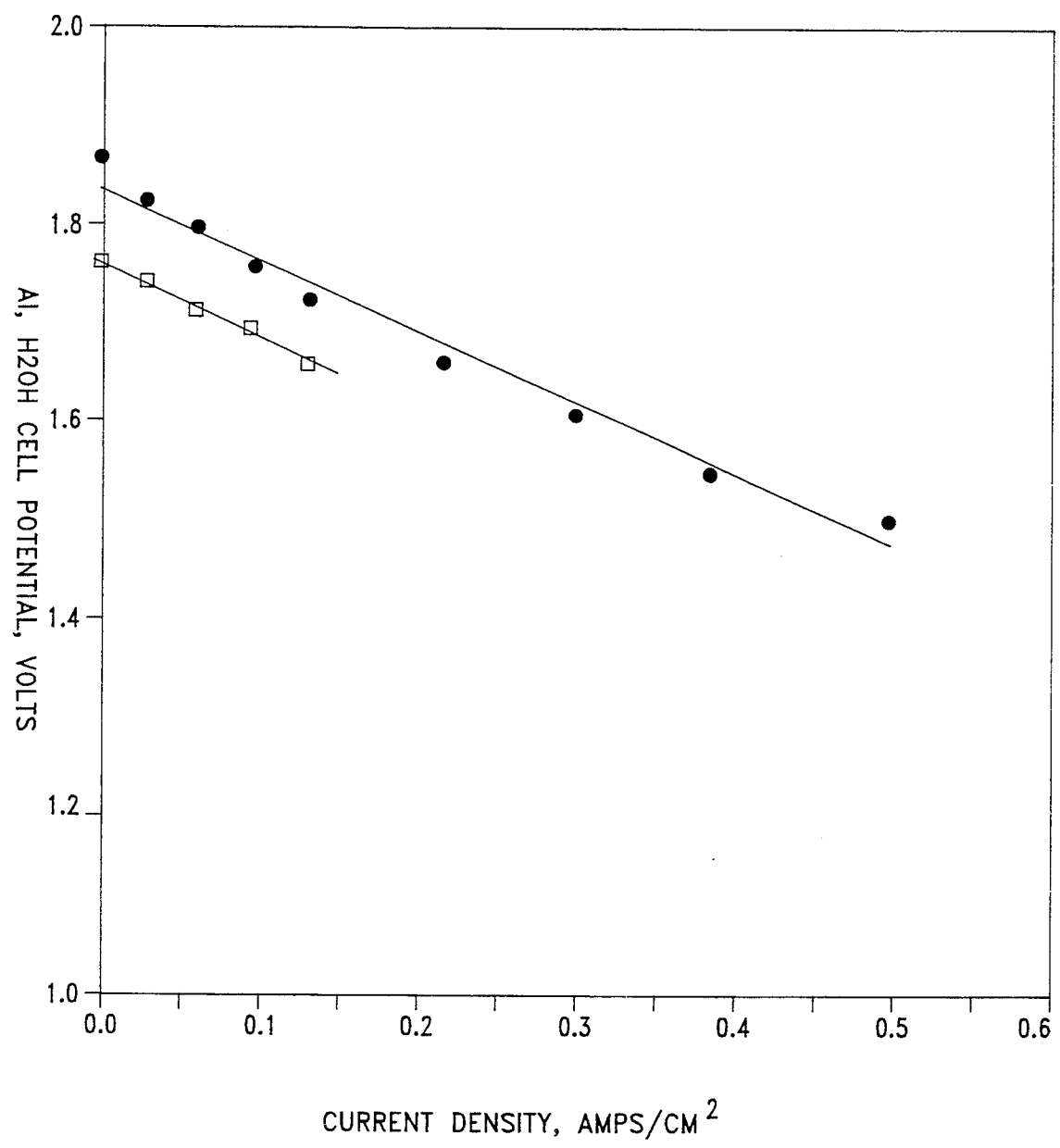
FIG. 4 graphically represents the improved performance of the anode with the new configuration described for the battery according to the teachings of subject invention.

FIG. 4 shows graphically the measured voltage of the battery of this invention at a variety of discharge current densities. The battery achieves high current densities and open circuit voltages of 1.9 volt, 100 mV more positive than attainable in the single electrolyte chamber $Al-H_2O_2$ battery. The battery is as represented in FIG. 1 and consists of an anolyte chamber in contact with a catholyte chamber. The anolyte chamber is constructed from a 1″ by 1.5″ aluminum anode and a 0.023″ (VEXAR TM) spacer. The porous electrocatalytic material consists of a 1″×1.5″, 0.06″ thick porous nickel with a chemically deposited Iridium/Palladium overlayer. The catholyte chamber is constructed from a second 0.23″ (VEXAR TM) spacer placed against the second (left hand) side of the porous electrocatalyst. A 55° C. aqueous solution containing 3M NaOH, 0.6 mM $Na_2SnO_3$ and 0.6 mM $Ga_2O_3$ was maintained in an external vessel and introduced by pressurized flow into the anolyte chamber. A 55° C. aqueous solution containing 0.5M $H_2O_2$, 3M NaOH, 0.6 mM $Na_2SnO_3$ and 0.6 mM $Ga_2O_3$ was maintained in a second external vessel and introduced by pressurized flow into the catholyte chamber. Electrical contacts to the aluminum anode and nickel cathode were made through a variable resistance carbon pile load; which was varied to a variety of current densities.

Figure 5:
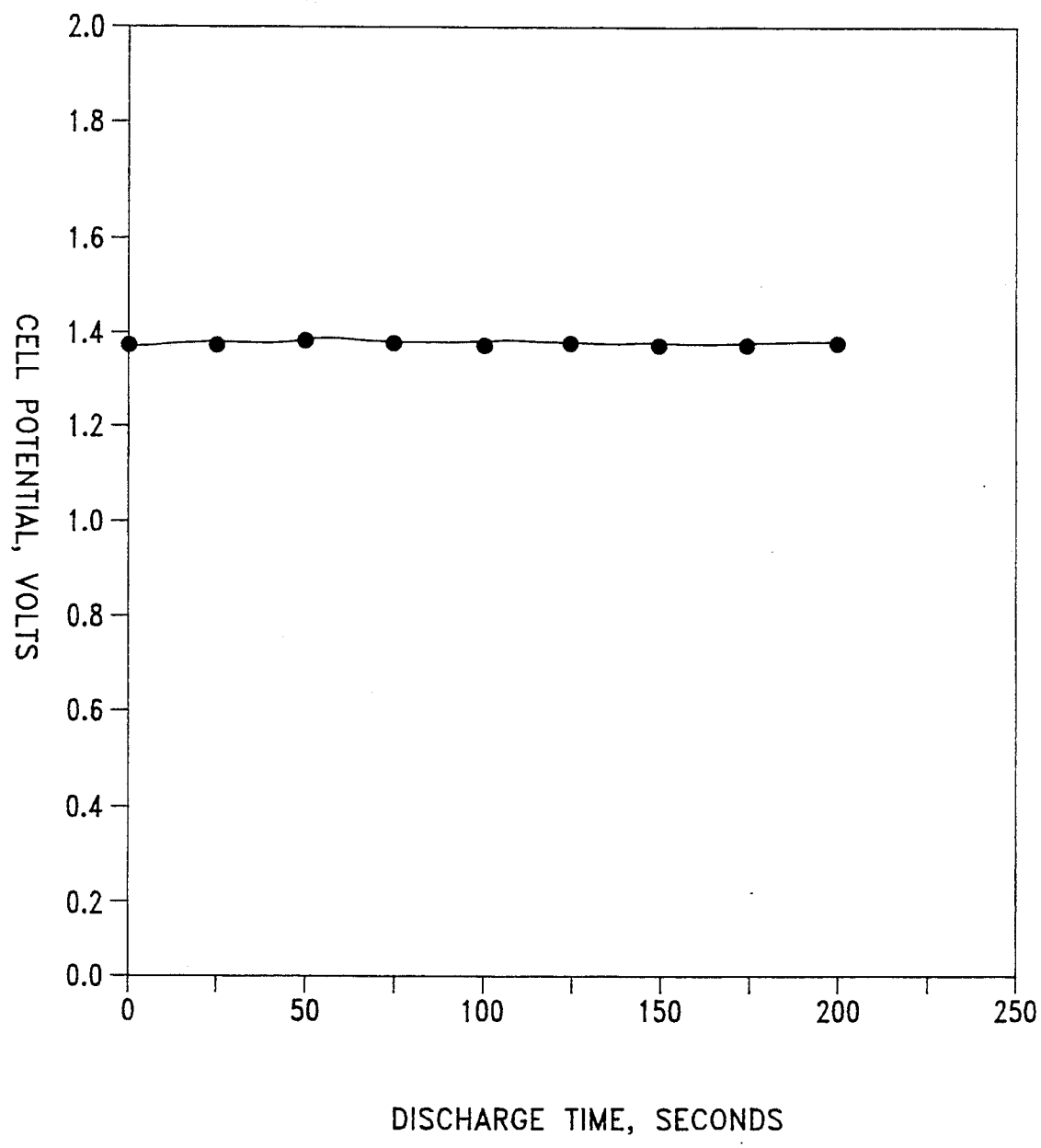
FIG. 5 illustrates graphically the constant current discharge as a function of cell potential for the battery of subject invention.

FIG. 5 shows graphically experimental results of a constant current (500 mA/cm$^2$) discharge of the battery of this invention.

There is thus described a dual flow battery including an aluminum anode chamber, a hydrogen peroxide catholyte and a conductive porous electrocatalyst with aqueous alkali, seawater or a mixture of aqueous alkali and seawater as the electrolyte. This dual flow battery is characterized by the utilization of a highly porous electrocatalyst to separate the reactive catholyte solution from the anodic compartment. It should be noted that embodiments described herein are to be considered illustrations rather than limitations. It will be manifested to those skilled in the art that various modifications may be made without deviating from the teachings of subject inventive concept herein described except in so far as indicated by the scope of the appended claims.

What is claimed is:

1. An electrical storage cell comprising:
a housing;
an aqueous hydrogen peroxide catholyte within said housing;
an aqueous anolyte within said housing;
a porous solid electrocatalyst positioned to separate said anolyte from said catholyte and formed of a material capable of converting hydrogen peroxide to hydroxide ion; and
an aluminum anode positioned within said anolyte.

2. The electrical storage cell of claim 1 wherein said electrocatalyst is a porous conductor.

3. The electrical storage cell of claim 2 wherein said porous conductor used as an electrocatalyst is a member selected from the group consisting of porous nickel, copper, silver, zinc or graphite, coated with a material electrocatalytic to the reduction of hydrogen peroxide, selected from the group consisting of platinum, iridium, palladium and alloys thereof.

4. The electrical storage cell of claim 1 wherein said aqueous anolyte includes a hydroxide compound.

5. The electrical storage cell of claim 1 wherein said aqueous catholyte solutions includes a hydroxide compound.

6. The electrical storage cell of claim 1 wherein the hydroxide has a cation selected from the group consisting of $Li^+$ ions, $Na^+$ ions, $K^+$ ions, $Cs^+$ ions, $NH_4^+$ ions, $Mg^{2+}$ ions, $Ca^{2+}$ ions, $Ba^{2+}$ ions, $Al^{3+}$ ions and mixtures thereof.

7. The electrical storage cell of claim 1 wherein said aqueous anolyte solution includes a salt.

8. The electrical storage cell of claim 1 wherein said aqueous catholyte solution includes a salt.

9. The electrical storage cell of claim 7 wherein said salt has a cation selected from the group consisting of $Li^+$ ions, $Na^+$ ions, $K^+$ ions, $Cs^+$ ions, $NH_4^+$ ions, $Mg^{2+}$ ions, $Ca^{2+}$ ions, $Ba^{2+}$ ions, $Al^{3+}$ ions and mixtures thereof.

10. The electrical storage cell of claim 8 wherein said salt has a cation selected from the group consisting of $Li^+$ ions, $Na^+$ ions, $K^+$ ions, $Cs^+$ ions, $NH_4^+$ ions, $Mg^{2+}$ ions, $Ca^{2+}$ ions, $Ba^{2+}$ ions, $Al^{3+}$ ions and mixtures thereof.

11. The electrical storage cell of claim 1 wherein at least one of said aqueous anolyte or catholyte solutions has a conductivity selected from the range of 0.001 millimho/cm to 2 mho/cm.

12. The electrical storage cell of claim 1 wherein said aqueous anolyte includes seawater.

13. The electrical storage cell of claim 1 in which said catholyte is 0.001 molar to saturated hydrogen peroxide.

14. The electrical storage cell of claim 1 in which said catholyte is 0.5 to 1.5 molar hydrogen peroxide.

15. The electrical storage cell of claim 1 in which the aluminum anode material is replaced by a material selected from the group consisting of a lithium anode material comprised of at least about 99.99% purity or a lithium alloy.

16. The electrical storage cell of claim 1 in which the aluminum anode material is replaced by a calcium anode material comprised of at least about 99.99% purity or a calcium alloy.

17. The electrical storage cell of claim 1 in which the aluminum anode material is replaced by a magnesium anode material comprised of at least about 99.99% purity or a magnesium alloy.

* * * * *